(12) United States Patent
Makara

(10) Patent No.: US 8,792,023 B2
(45) Date of Patent: Jul. 29, 2014

(54) HEAT DISSIPATING SYSTEM FOR AN IMAGE PICKUP APPARATUS

(75) Inventor: Hironobu Makara, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 13/212,882

(22) Filed: Aug. 18, 2011

(65) Prior Publication Data

US 2012/0050608 A1    Mar. 1, 2012

(30) Foreign Application Priority Data

Aug. 24, 2010    (JP) .................................. 2010-187126

(51) Int. Cl.
*H04N 9/64*      (2006.01)
*H04N 5/262*     (2006.01)
*H04N 5/225*     (2006.01)

(52) U.S. Cl.
USPC ...................... 348/244; 348/240.99; 348/374

(58) Field of Classification Search
CPC .................. H04N 5/2257; H04N 2201/02456; H04N 2101/00; H04N 2201/02497; H01L 31/0203; H01L 31/024; H01L 23/34; G03B 21/16
See application file for complete search history.

(56) References Cited

U.S. PATENT DOCUMENTS

| | | | | |
|---|---|---|---|---|
| 2005/0259156 A1* | 11/2005 | Kosaka et al. | ............. | 348/208.7 |
| 2006/0290893 A1* | 12/2006 | Lim et al. | ......................... | 353/57 |
| 2007/0024743 A1 | 2/2007 | Hida | | |
| 2008/0273250 A1* | 11/2008 | Nishio | ........................... | 359/689 |
| 2009/0002549 A1 | 1/2009 | Kobayashi | | |
| 2009/0237537 A1 | 9/2009 | Maruyama | | |

FOREIGN PATENT DOCUMENTS

| | | |
|---|---|---|
| CN | 101086597 A | 12/2007 |
| CN | 101106642 A | 1/2008 |
| CN | 101281346 A | 10/2008 |
| CN | 101334579 A1 | 12/2008 |
| EP | 1748640 A1 | 1/2007 |
| JP | 02-308559 A | 12/1990 |
| JP | 04-331580 | * 11/1992 |
| JP | 2005-354637 A | 12/2005 |
| JP | 2009-33718 A | 2/2009 |

* cited by examiner

*Primary Examiner* — Aung S Moe
*Assistant Examiner* — Euel Cowan
(74) *Attorney, Agent, or Firm* — Canon USA Inc IP Division

(57) ABSTRACT

An image pickup apparatus includes an image pickup element; a heat dissipating member including a heat dissipating portion and thermally connected to the image pickup element; a housing that retains the image pickup element and the heat dissipating member such that the image pickup element and the heat dissipating member are movable, the housing having an opening at which the heat dissipating portion is exposed irrespective of the position of the image pickup element and the heat dissipating member in a movable range; a fan that generates an airflow; and a duct that forms an air flow channel that directs the airflow generated by the fan toward the opening.

4 Claims, 7 Drawing Sheets

HEAT DISSIPATING SYSTEM FOR AN IMAGE PICKUP APPARATUS

BACKGROUND OF THE INVENTION

1. Field of the Invention

The present invention relates to an image pickup apparatus, and more particularly, to a structure for cooling an image pickup element.

2. Description of the Related Art

Image pickup elements convert light into electric signals. When the temperature of an image pickup element increases, unnecessary noise components are superimposed on signals output by the image pickup element, which leads to reduction in image quality. Therefore, it is essential to cool the image pickup element in an apparatus including the image pickup element.

Japanese Patent Laid-Open No. 2005-354637 discloses a structure in which an image pickup element is mechanically connected to an apparatus housing with a heat dissipating member so that heat generated by the image pickup element is dissipated to the outside through the surface of the apparatus by heat conduction. This method is inexpensive and can be achieved by a simple structure, and is therefore widely used in product assemblies.

Japanese Patent Laid-Open No. 2009-33718 (US Patent Application Publication No. 2009/0002549) discloses a structure in which an image pickup element is forcedly air-cooled by forming an air flow channel around the image pickup element. With this method, the cooling effect can be increased and the temperature of the apparatus housing can be prevented from increasing. Thus, this method is more advantageous than the above-described method using heat conduction in many aspects.

Image pickup apparatuses, such as digital cameras, generally include a zooming mechanism which changes an angle of view of an image to be captured by moving one of or more of lens groups included in an imaging optical system. In addition, recently, structures in which an image pickup element, on which an object image is formed, is moved together with movable lens groups in a zooming operation have been proposed as a way to reduce the size of the imaging optical system and increase the reliability.

In the structures in which the image pickup element is moved in the zooming operation, the above-described cooling methods have the following problems.

That is, with regard to the cooling method using heat conduction, it is difficult to apply the cooling method to the structure in which the image pickup element is moved since the image pickup element is required to be mechanically connected to the apparatus housing or the like with the heat dissipating member.

With regard to the forced air cooling method, there are difficulties in forming a direct air flow channel around the image pickup element. More specifically, since the position of the image pickup element changes during the zooming operation, it is necessary to move the air flow channel in accordance with the position of the image pickup element. This makes the cooling effect unstable. Accordingly, it becomes necessary to increase the size of the apparatus to form an effective air flow channel depending on the arrangement of the image pickup element and the space around the image pickup element. In addition, since the image pickup element functions as a part of a lens mechanism, the air flows in the lens. As a result, dust enters the lens and scatters in the lens.

SUMMARY OF THE INVENTION

An aspect of the present invention provides an image pickup apparatus including an image pickup element; a heat dissipating member including a heat dissipating portion and thermally connected to the image pickup element by being fixed to the image pickup element; a housing that retains the image pickup element and the heat dissipating member such that the image pickup element and the heat dissipating member are movable, the housing having an opening at which the heat dissipating portion is exposed irrespective of the position of the image pickup element and the heat dissipating member in a movable range; a fan that generates an airflow; and a duct that forms an air flow channel that directs the airflow generated by the fan toward the opening.

According to the present invention, the image pickup element can be stably cooled irrespective of the position of the image pickup element that is movably retained in a housing.

Further features of the present invention will become apparent from the following description of exemplary embodiments with reference to the attached drawings.

DESCRIPTION OF THE EMBODIMENTS

A digital camera will be described with reference to the drawings as an image pickup apparatus according to an embodiment of the present invention.

Figure 1A:
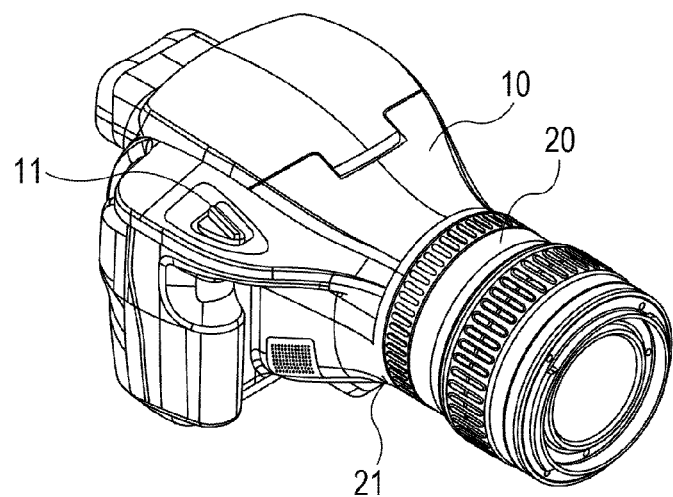
FIGS. 1A to 1C are perspective views illustrating a digital camera according to an embodiment.
Figure 1B:
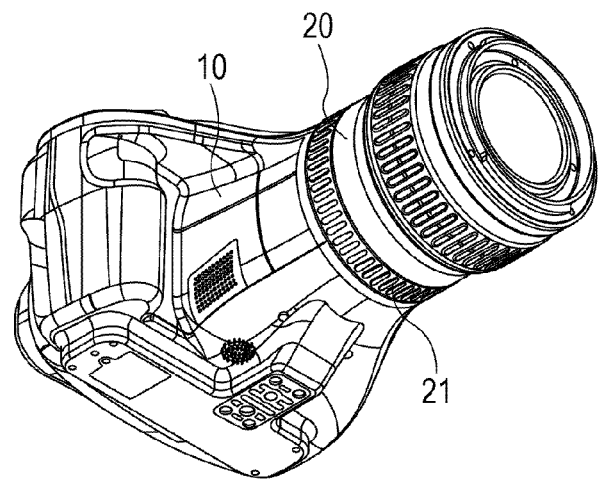
Figure 1C:
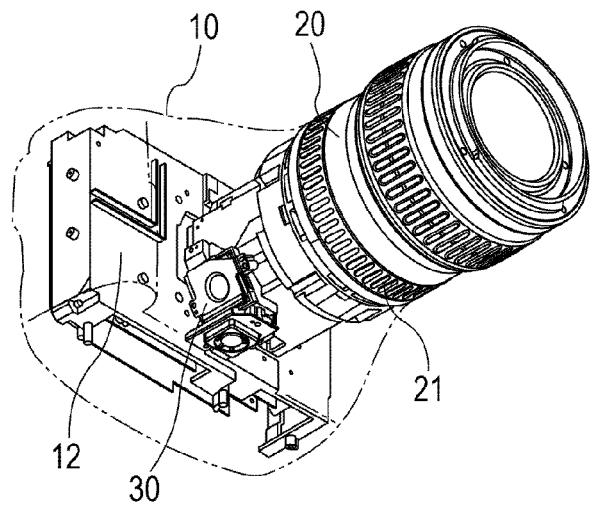

FIGS. 1A to 1C are perspective views illustrating a digital camera according to the present embodiment. FIGS. 1A and 1B are perspective views illustrating the external appearance of the digital camera according to the present embodiment, and FIG. 1C is a perspective view illustrating the internal structure of the digital camera according to the present embodiment.

As illustrated in FIGS. 1A and 1B, the digital camera according to the present embodiment includes a camera body 10 and a lens unit 20. The camera body 10 includes a zoom key 11, and the lens unit 20 includes a zoom ring 21. As illustrated in FIG. 1C, a controller 12 is disposed in the camera body 10. The controller 12 executes a zooming operation, which is an operation of zooming in or zooming out, on the basis of signals output from the zoom key 11 or the zoom ring 21.

As illustrated in FIG. 1C, the lens unit 20 also includes a cooling unit 30 for cooling an image pickup element, which will be described below.

Figure 2:
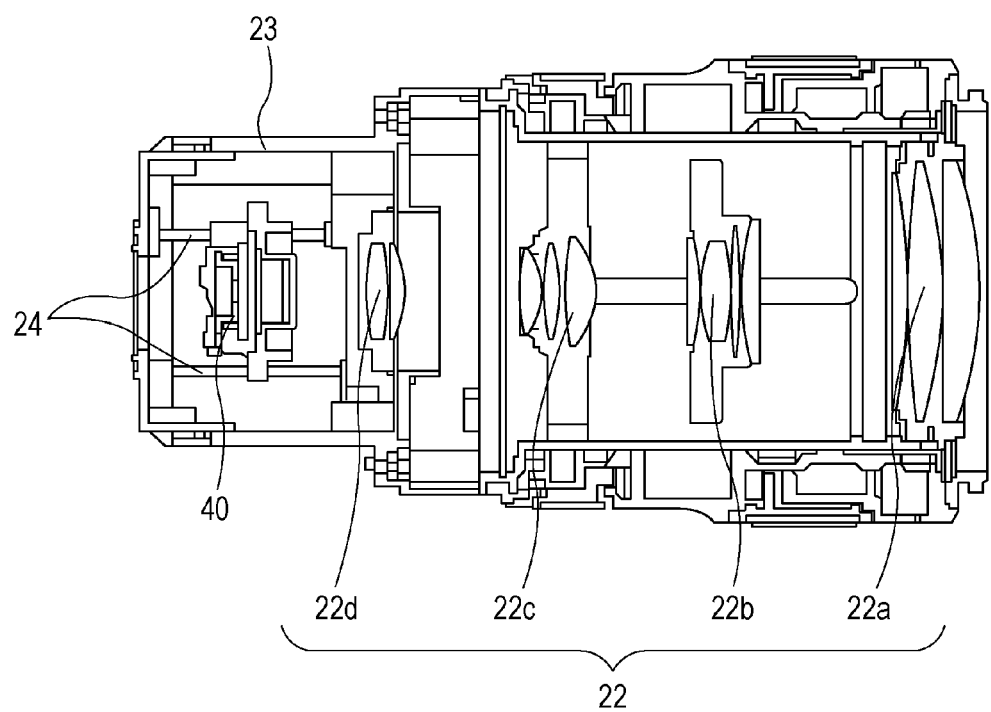
FIG. 2 is a sectional view of a lens unit taken along a vertical plane including an optical axis.

The internal structure of the lens unit 20 will now be described with reference to FIG. 2. FIG. 2 is a sectional view of the lens unit 20 taken along a vertical plane including an optical axis. The lens unit 20 includes a lens housing 23, and an imaging lens group 22 and an image pickup unit 40 are housed in the lens housing 23. The imaging lens group 22 includes a first lens group 22a, a second lens group 22b, a third lens group 22c, and a fourth lens group 22d. An object image passes through the imaging lens group 22, and is focused on the image pickup unit 40. The lens housing 23 corresponds to a housing that retains the image pickup unit 40 in a movable manner.

In the present embodiment, the second lens group 22b, the fourth lens group 22d, and the image pickup unit 40 are movable groups that are movable in an optical axis direction, and are driven by respective actuators. Thus, each of the movable groups is moved in the optical axis direction.

When a user operates the zoom key 11 or the zoom ring 21, the controller 12 controls the actuators accordingly. Thus, the zooming operation is performed.

Figure 3:
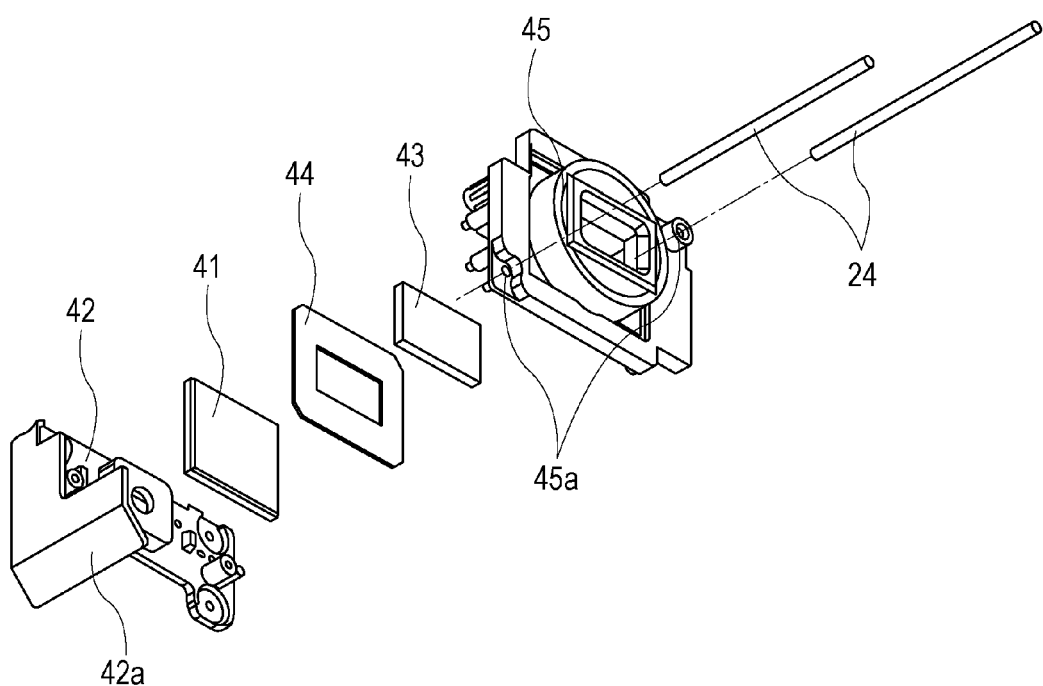
FIG. 3 is an exploded perspective view of an image pickup unit.

FIG. 3 is an exploded perspective view of the image pickup unit 40. The image pickup unit 40 includes an image pickup element 41, a heat dissipating member 42, a low-pass filter 43, a rubber bush 44, and a holder 45, which are integrated with each other. The image pickup element 41 converts the object image focused by the imaging lens group 22 into electric signals and outputs the electric signals. The image pickup element 41 is a photoelectric conversion element such as a complementary metal-oxide semiconductor (CMOS) sensor or a charge coupled device (CCD) sensor.

As illustrated in FIG. 3, the heat dissipating member 42 includes a heat dissipating portion 42a. The heat dissipating portion 42a is shaped so as to extend in the optical axis direction such that the heat dissipating portion 42a is exposed at an opening 25, which will be described below, in the lens housing 23 irrespective of the position of the image pickup unit 40 in a movable range thereof. The heat dissipating member 42 is fixed to the image pickup element 41 such that the heat dissipating member 42 is in contact with the back surface of the image pickup element 41. The heat dissipating member 42 is also fixed to the holder 45, thereby providing a function of positioning the image pickup element 41. Thus, the heat dissipating member 42 is thermally connected to the image pickup element 41. Guide holes 45a are formed in the holder 45 so as to extend in the optical axis direction, and guide shafts 24 provided in the lens unit 20 are inserted through the guide holes 45a. Thus, the image pickup unit 40 can be accurately moved in the optical axis direction.

Figure 4A:
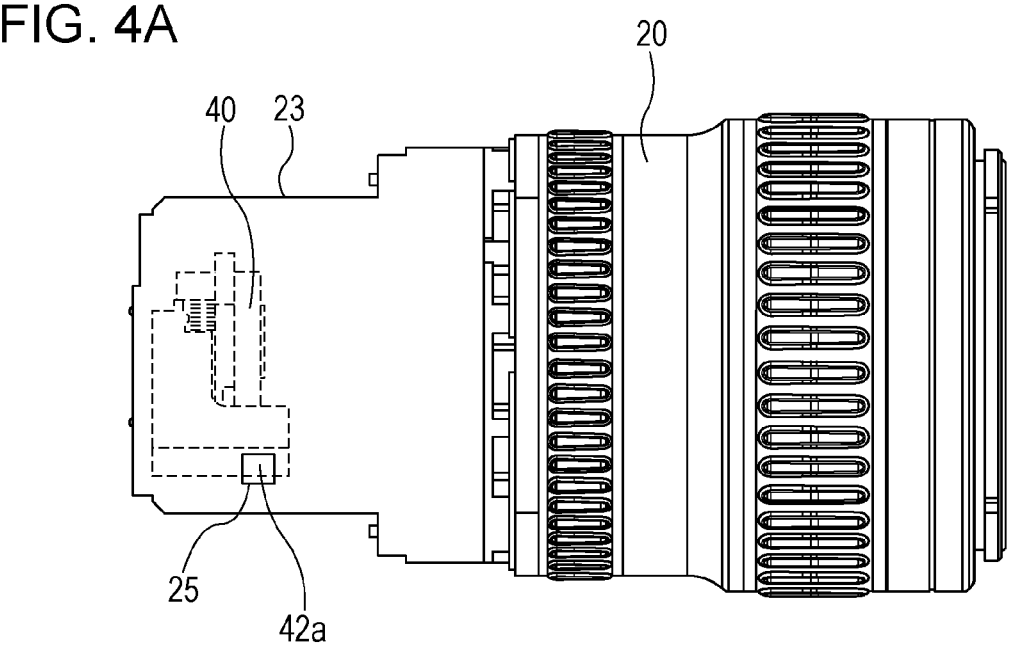
FIGS. 4A and 4B illustrate the positions of a heat dissipating portion when the image pickup unit is moved in an optical axis direction.
Figure 4B:
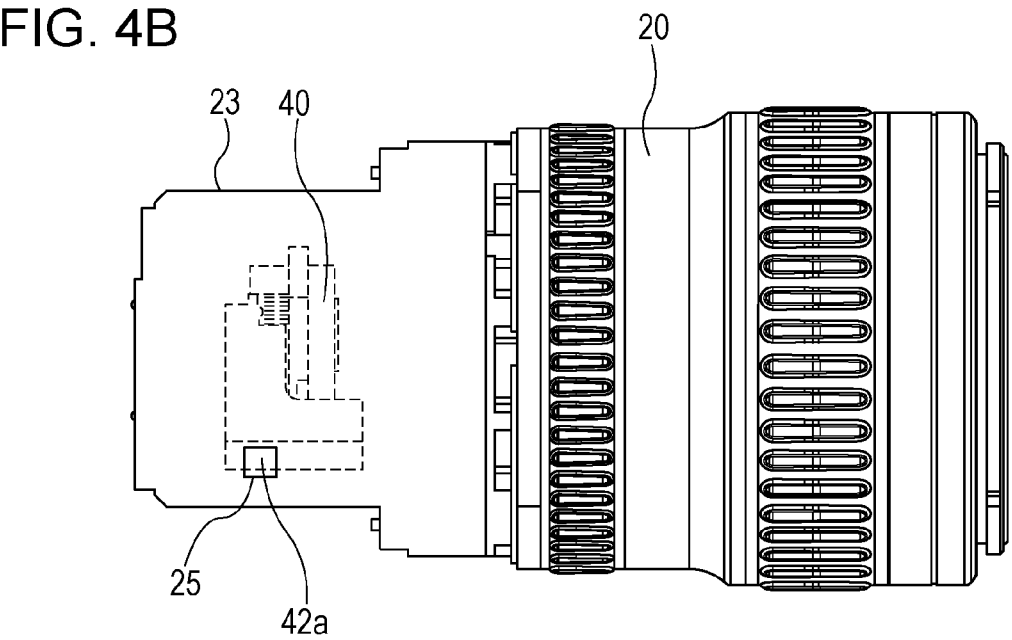

FIGS. 4A and 4B illustrate the positions of the heat dissipating portion 42a when the image pickup unit 40 is moved in the optical axis direction in accordance with the zooming operation of the lens unit 20. The opening 25 is formed in a side surface of the lens housing 23, and the image pickup unit 40 is disposed in the lens unit 20 such that the heat dissipating portion 42a is exposed at the opening 25. FIG. 4A illustrates the state in which the image pickup unit 40 is at the rear end of the movable range thereof. In this state, a front end portion of the heat dissipating portion 42a is exposed at the opening 25, and the heat dissipating portion 42a is positioned so as to entirely cover the opening 25. FIG. 4B illustrates the state in which the image pickup unit 40 is at the front end of the movable range thereof. In this state, a rear end portion of the heat dissipating portion 42a is exposed at the opening 25, and the heat dissipating portion 42a is positioned so as to entirely cover the opening 25. Thus, irrespective of the position of the image pickup unit 40 in the movable range thereof, the heat dissipating portion 42a is exposed at the opening 25 and is positioned so as to entirely cover the opening 25. Therefore, foreign matter, such as dust, can be prevented from entering the lens unit 20 through the opening 25.

Figure 5A:
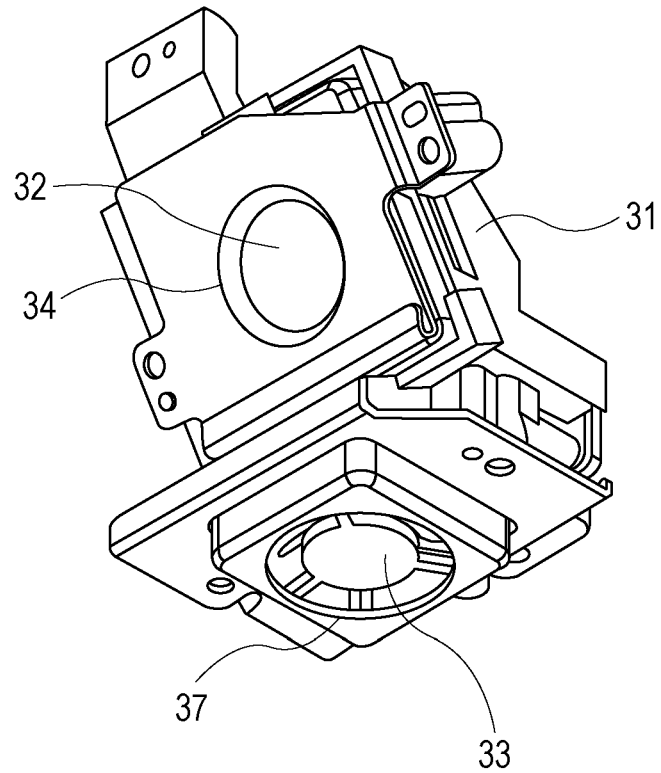
FIGS. 5A and 5B are perspective views illustrating the external appearance of a cooling unit.
Figure 5B:
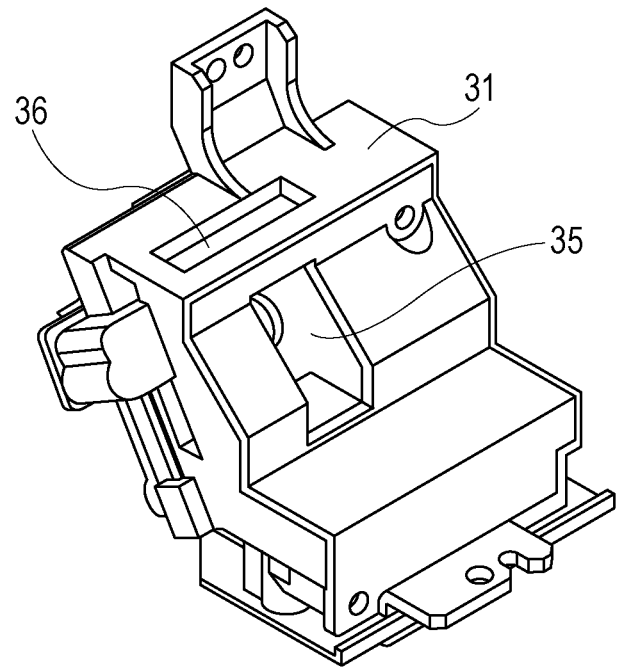

FIGS. 5A and 5B are perspective views illustrating the external appearance of the cooling unit 30. The cooling unit 30 includes a fan duct 31, a blower fan 32, and a blower fan 33, which are integrated with each other. The blower fan 32 corresponds to a first fan, and the blower fan 33 corresponds to a second fan. The fan duct 31 has a discharge port 35 through which air sucked in by the blower fan 32 is discharged and an intake port 36 through which air is sucked in by the blower fan 33. The blower fan 32 has an intake port 34, and is tightly fixed to the fan duct 31. The blower fan 33 has an exhaust port 37, and is tightly fixed to the fan duct 31. Accordingly, the fan duct 31 includes a first air flow channel through which the air is sucked in through the intake port 34 by the blower fan 32 and discharged through the discharge port 35. In addition, the fan duct 31 also includes a second air flow channel through which the air in the fan duct 31 is discharged through the exhaust port 37 by the blower fan 33 so that fresh air is introduced into the fan duct 31 through the intake port 36.

Figure 6:
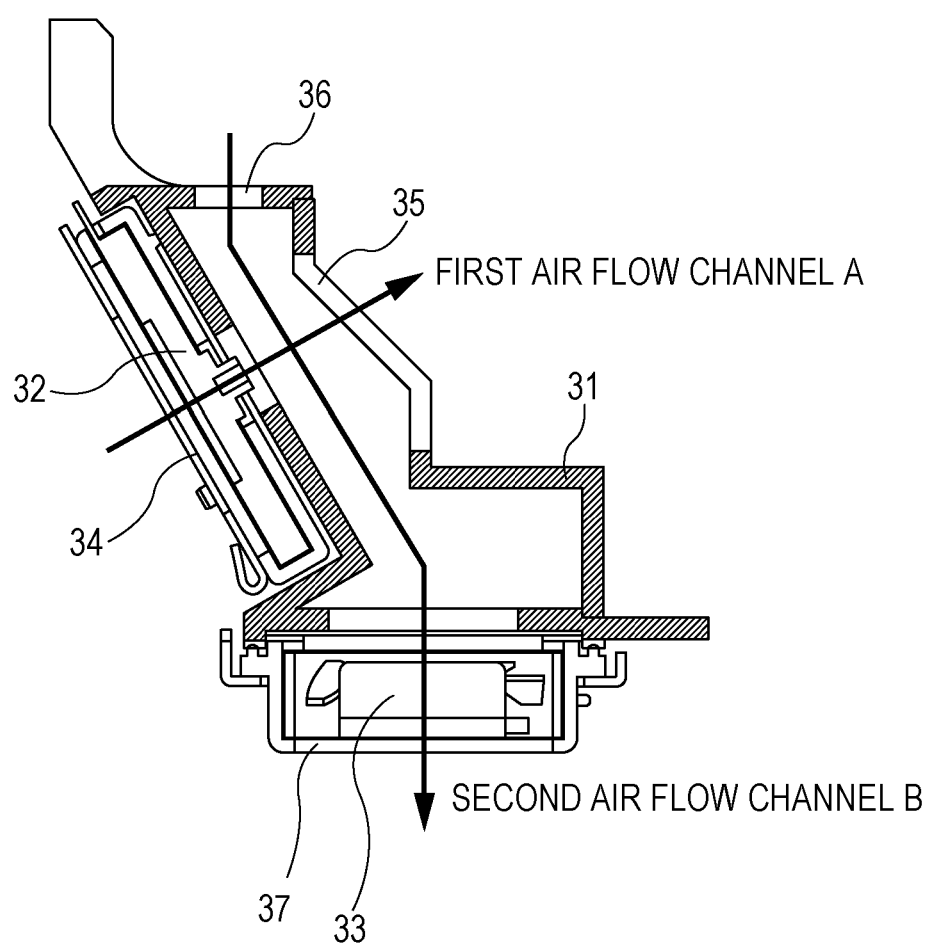
FIG. 6 is a sectional view of the cooling unit taken along a plane orthogonal to the optical axis.

FIG. 6 is a sectional view of the cooling unit 30 taken along a plane orthogonal to the optical axis. The fan duct 31 includes the first air flow channel A formed by the blower fan 32 and the second air flow channel B formed by the blower fan 33. As illustrated in FIG. 6, the first air flow channel A and the second air flow channel B intersect.

In the present embodiment, the blower fan 32 has high-pressure characteristics, so that a high-speed airflow with high directivity and high local air-cooling performance is formed in the first air flow channel A. The blower fan 33 has a large flow rate, so that an airflow that collects air from the entire inner space of the fan duct 31 and uniformly ventilates the fan duct 31 is formed in the second air flow channel B. Since the blower fans 32 and 33 are provided with the respective intake ports, cool external air continuously flows into the first air flow channel A and the second air flow channel B maintains the ventilating performance that corresponds to the large flow rate of the blower fan 33. Thus, the performance of each air flow channel can be exploited to the maximum.

Figure 7:
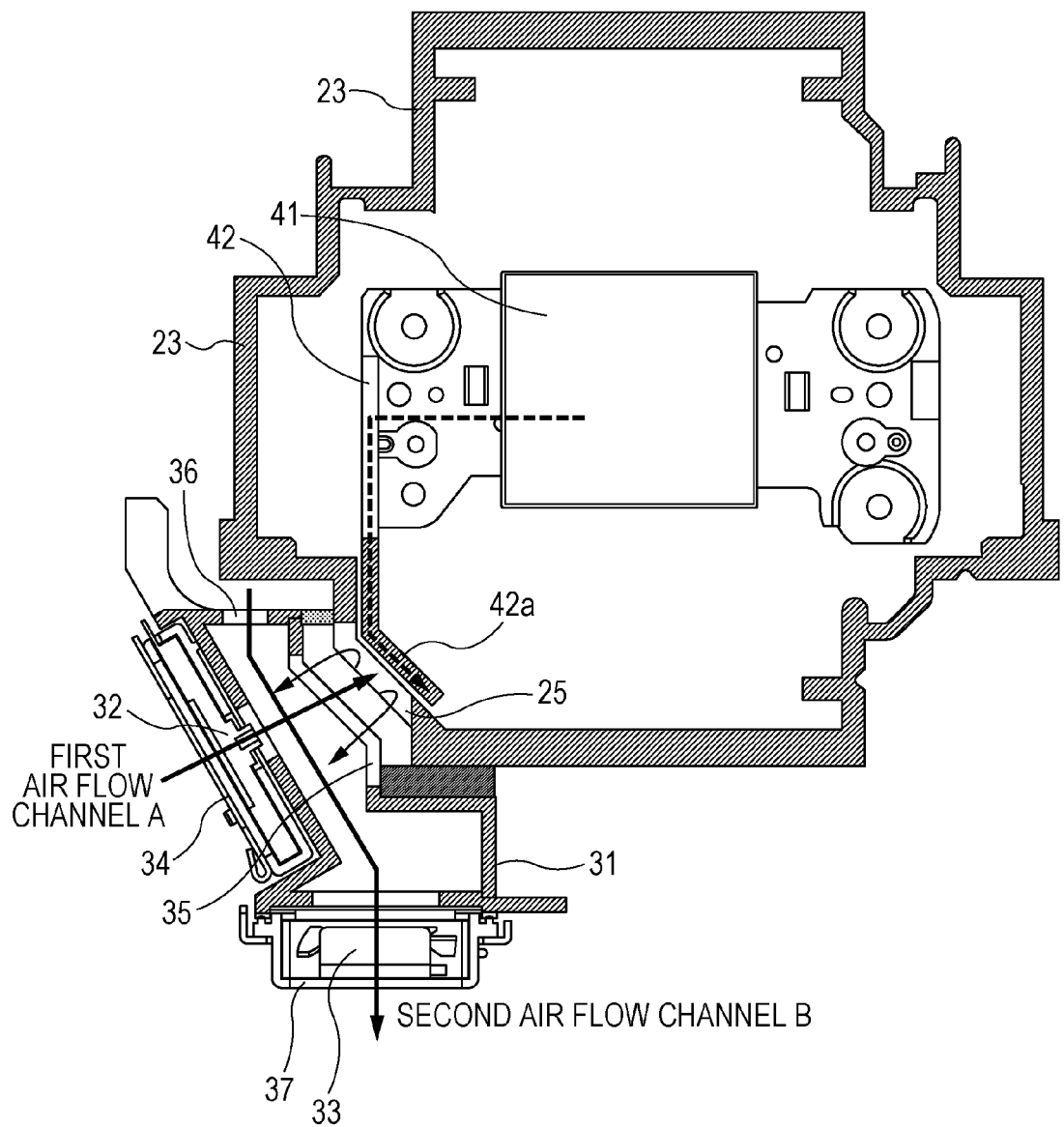
FIG. 7 is a sectional view of the lens unit and the cooling unit taken along a plane orthogonal to the optical axis.

FIG. 7 is a sectional view of the lens unit 20 and the cooling unit 30 taken along a plane orthogonal to the optical axis at a position near the image pickup unit 40. Heat generated by the image pickup element 41 is transmitted through the heat dissipating member 42 to the heat dissipating portion 42a by heat conduction (see the dotted line in FIG. 7). As illustrated in FIG. 7, when the cooling unit 30 is attached to the lens unit 20, the discharge port 35 is opposed to the opening 25. Thus, since the discharge port 35 is formed, the first air flow channel A which causes the air sucked in by the blower fan 32 to flow to the opening 25 is formed in the fan duct 31. The heat dissipating portion 42a is exposed to the inside of the fan duct 31 at the opening 25 and the discharge port 35, and is forcedly cooled when the air that flows through the first air flow channel A at a high speed is blown onto the heat dissipating portion 42a. As described above, the heat dissipating portion 42a is shaped so as to extend in the optical axis direction at a position near the inner wall of the lens housing 23. Therefore, the heat dissipating portion 42a is exposed at the opening 25 irrespective of the position of the image pickup unit 40, and the opening 25 is completely covered by the heat dissipating portion 42a. The air that has been blown onto the heat dissipating portion 42a and whose temperature has been increased is dispersed in the fan duct 31, and is then discharged out of the fan duct 31 through the second air flow channel B.

The above-described image pickup apparatus according to the present embodiment provides the following advantages. That is, since the heat dissipating member that moves together with the image pickup element is locally air-cooled by a high-speed airflow, the image pickup element that moves can be efficiently cooled. Since the air flow channels are formed outside the lens unit and the cooling mechanism and the image pickup mechanism are structurally separated from each other, the air-cooling mechanism can be optimized and the overall size of the apparatus can be reduced. Since the opening in the lens housing is covered by the heat dissipating portion irrespective of the position of the heat dissipating member, high dust resistance of the lens unit can be ensured. Since multiple blower fans having different characteristics are provided and the blower fans are provided with the respective intake ports, the cooling effect can be maximized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187126 filed Aug. 24, 2010, which is hereby incorporated by reference herein in its entirety.

What is claimed is:

1. An image pickup apparatus comprising:
   an image pickup element;
   a heat dissipating member including a heat dissipating portion and thermally connected to the image pickup element by being fixed to the image pickup element;
   a housing that retains the image pickup element and the heat dissipating member such that the image pickup element and the heat dissipating member are movable, the housing having an opening at which the heat dissipating portion is exposed; and
   a fan that generates an airflow;
   wherein the heat dissipating portion is exposed at the opening so as to cover with the opening irrespective of the position of the image pickup element and the heat dissipating member in a movable range, and
   wherein the airflow generated by the fan is directed toward the heat dissipating member covered with the opening.

2. The image pickup apparatus according to claim 1, wherein the image pickup element and the heat dissipating member are retained by the housing such that the image pickup element and the heat dissipating member are movable in an optical axis direction in accordance with a zooming operation of an imaging lens.

3. An image pickup apparatus comprising:
   an image pickup element;
   a heat dissipating member including a heat dissipating portion and thermally connected to the image pickup element by being fixed to the image pickup element;
   a housing that retains the image pickup element and the heat dissipating member such that the image pickup element and the heat dissipating member are movable, the housing having an opening at which the heat dissipating portion is exposed;
   a first fan that generates an airflow;
   a duct that forms a first air flow channel and a second air flow channel that intersects the first air flow channel; and
   a second fan that discharges air from the second air flow channel,
   wherein the heat dissipating portion is exposed at the opening so as to cover with the opening irrespective of the position of the image pickup element and the heat dissipating member in a movable range, and
   wherein the first air flow channel directs airflow generated by the first fan toward the heat dissipating member covered with the opening.

4. The image pickup apparatus according to claim 3, wherein the image pickup element and the heat dissipating member are retained such that the image pickup element and the heat dissipating member are movable in an optical axis direction in accordance with a zooming operation of an imaging lens.

* * * * *